United States Patent [19]

Fujii et al.

[11] 4,192,345
[45] Mar. 11, 1980

[54] SEALED TYPE HYDRAULIC RESERVOIR

[75] Inventors: Takashi Fujii, Toyota; Atsushi Ohmi, Anjo; Tomoyuki Nogami, Toyota; Takaaki Ohta, Okazaki, all of Japan

[73] Assignees: Aisin Seiki Kabushiki Kaisha, Kariya; Toyota Jidosha Kogyo Kabushiki Kaisha, Toyota, both of Japan

[21] Appl. No.: 850,484

[22] Filed: Nov. 10, 1977

[30] Foreign Application Priority Data

Nov. 11, 1976 [JP] Japan .................... 51-135647

[51] Int. Cl.² .................................................. F15B 7/10
[52] U.S. Cl. .................................. 137/572; 60/586; 60/592; 220/208; 220/209
[58] Field of Search ............. 60/534, 535, 545, 585, 60/586, 592; 137/513.5, 853, 859, 572, 574; 220/208, 209

[56] References Cited

U.S. PATENT DOCUMENTS

| | | | |
|---|---|---|---|
| 2,622,762 | 12/1952 | Parsons | 220/209 |
| 3,196,617 | 7/1965 | Ferrell . | |
| 3,527,551 | 9/1970 | Kutik | 137/853 |
| 4,136,712 | 1/1979 | Nogami | 60/592 |

FOREIGN PATENT DOCUMENTS

| | | | |
|---|---|---|---|
| 2339279 | 2/1974 | Fed. Rep. of Germany | 60/535 |
| 2555867 | 7/1976 | Fed. Rep. of Germany | 60/535 |
| 47-23630 | 7/1972 | Japan . | |

*Primary Examiner*—Abraham Hershkovitz
*Attorney, Agent, or Firm*—Finnegan, Henderson, Farabow, Garrett & Dunner

[57] ABSTRACT

A sealed type hydraulic reservoir including a casing for storing brake fluid therein, a cap member detachably mounted on the casing and an elastic diaphragm member dividing the casing into upper and lower chambers. The lower chamber is defined by the diaphragm member and the liquid surface, and the pressure in the lower chamber is always maintained at the level of atmospheric pressure by two check valves, one for allowing the air flow from the upper to the lower chamber when the pressure in the lower chamber drops below the atmospheric level and the other for allowing the air flow from the lower to upper chamber when the pressure in the lower chamber rises above the atmospheric level.

6 Claims, 9 Drawing Figures

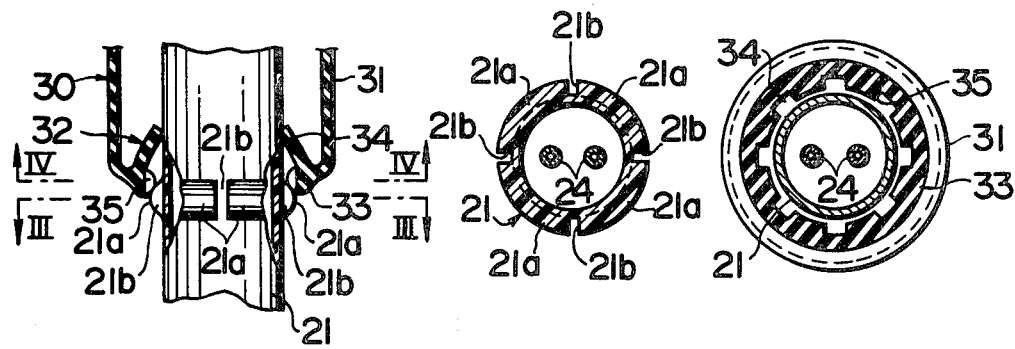
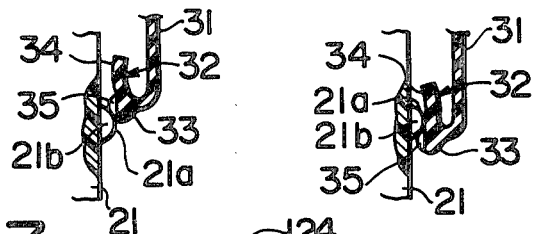
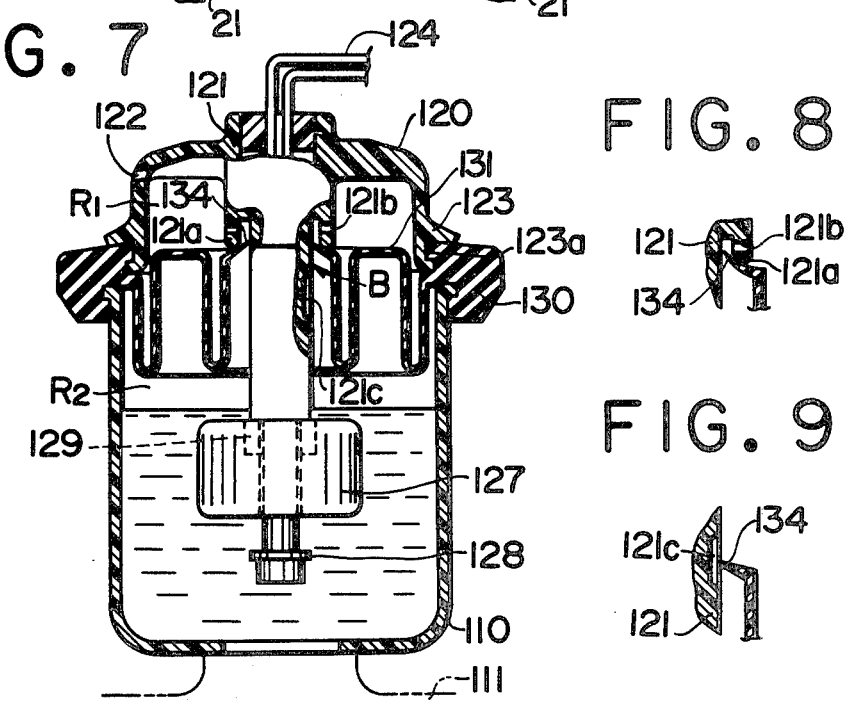
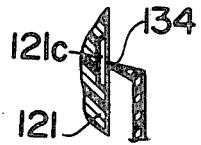

SEALED TYPE HYDRAULIC RESERVOIR

BACKGROUND OF THE INVENTION

1. Field of the Invention

This invention relates generally to a sealed type fluid reservoir and more particularly to a sealed type fluid reservoir of a brake master cylinder for use in a vehicle brake system.

2. Description of Prior Art

It has been known to use a sealed type fluid reservoir for a brake master cylinder in order to prevent the entrance of air, water or dirt into the brake system from the reservoir.

It has also been known to use a seal member, such as a bellows, diaphragm etc., for sealing the reservoir chamber from the surrounding atmospheric environment. Such seal members are vertically movable within the reservoir chamber in response to variations in the liquid level in the reservoir chamber so as to always maintain the pressure in the chamber at substantially atmospheric level. The range of vertical movement of the seal member is, however, limited by constructive reasons, such as size or space limitation of the reservoir.

One improvement has been made in, for example, U.S. Pat. No. 3,423,939 patented on Jan. 28, 1969, wherein a pressure relief valve is provided for the purpose of relieving any pressure in excess of approximately 1 p.s.i. in the reservoir. According to this prior art, the relief of excess pressure may be possible, but it may be impossible to supply pressure to the sealed chamber when the chamber is subjected to vacuum.

SUMMARY OF THE INVENTION

It is, therefore, an object of the present invention to provide an improved sealed type fluid reservoir for obviating the above conventional drawbacks.

It is a further object of the present invention to provide an improved sealed type fluid reservoir with check valve means which will normally prevent communication of the sealed chamber with the surrounding atmospheric environment and allow communication thereof with the atmospheric environment whenever the pressure in the sealed chamber rises above or drops below the atmospheric pressure level in order to always maintain the pressure in the sealed chamber at substantially atmospheric pressure level.

It is another object of the present invention to provide an improved sealed type fluid reservoir with check valves compactly and inexpensively assembled.

BRIEF DESCRIPTION OF THE DRAWINGS

Further objects and features of the invention will become more apparent from the description with reference to the attached drawings wherein;

FIG. 2 is an enlarged partial view of FIG. 1;

FIG. 3 is a cross sectional view taken along the line 3—3 of FIG. 2;

FIG. 4 is a cross sectional view taken along the line 4—4 of FIG. 2;

FIGS. 5 and 6 are explanatory views of the valve operation of the first embodiment;

FIG. 7 is a vertical sectional view of the second embodiment of the invention; and FIGS. 8 and 9 are explanatory views of valve operation in accordance with the second embodiment.

DETAILED DESCRIPTION OF THE INVENTION

Figure 1:
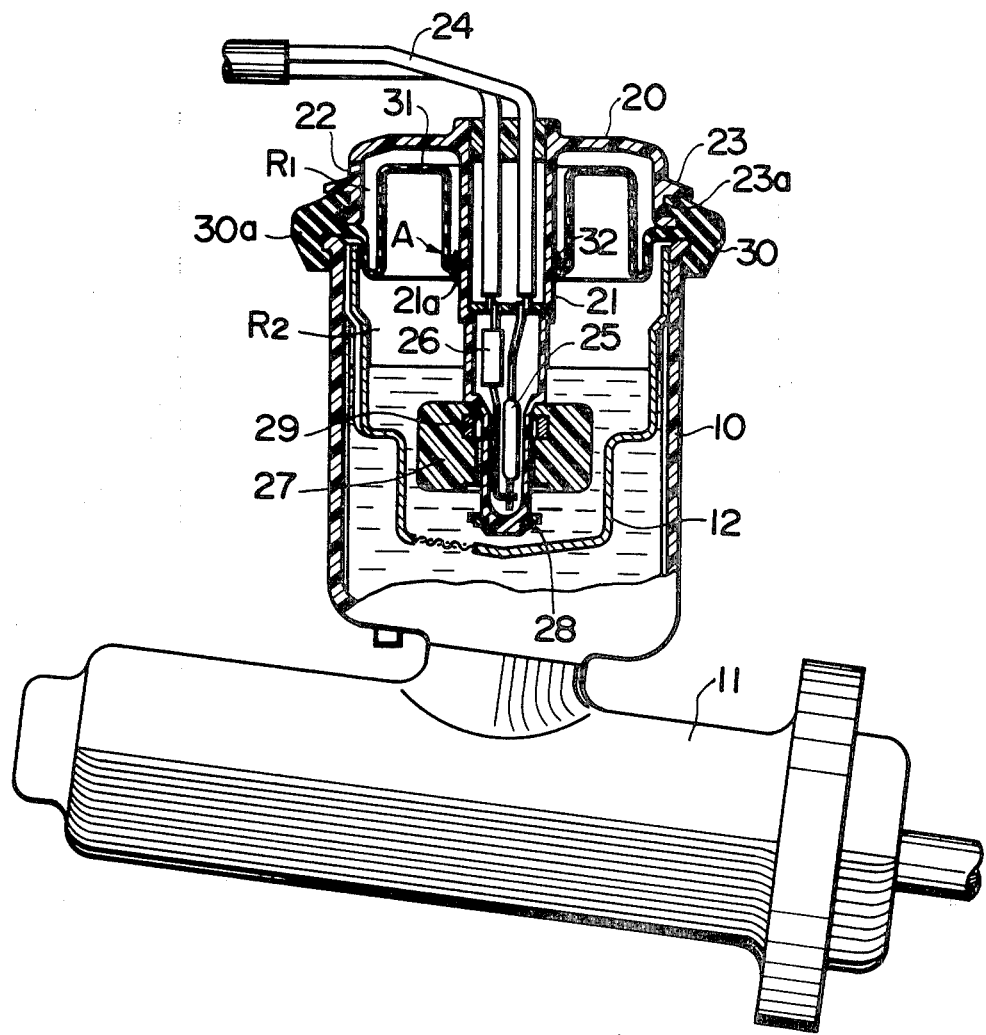
FIG. 1 is a vertical sectional view of the first embodiment of the invention.

Referring now to the drawings, in particular to FIGS. 1 through 6, a casing 10 is secured to a master brake cylinder 11 and includes a strainer to filter contaminants entering the casing 10. A cap member 20 is detachably mounted on the upper open end of the casing 10 for fluid-tightly covering the casing. The cap member 20 is provided with a vent hole 22 at the side wall portion thereof and an annular flange 23 extending outwardly from the side wall of the cap member 20 and formed integral therewith. The flange 23 is provided with an annular groove 23a for receiving therein a portion of a diaphragm member 30. The cap member 20 further includes a hollow cylindrical stepped projection 21 extending downwardly within the casing 10.

A reed switch 25 and a resistor 26 are incorporated within the interior of the projection 21 and are connected to a non-illustrated liquid level warning indicator through lead wires 24, a part thereof being disposed in the projection 21. The projection 21 has a large diameter portion at the upper part thereof and a reduced or small diameter portion at the lower part thereof. An annular outward projection 21a is formed at the outer peripheral part of the large diameter portion of the stepped projection 21, as is clearly shown in FIGS. 2 and 3. The annular outward projection 21a is of half-circular shape in section and has a predetermined diameter. A plurality of vertical grooves 21b (4 in this embodiment), are provided on the outward projection 21a in equally spaced relation with one another. A float member 27 is disposed in the small diameter portion of the stepped projection 21 and is vertically movable along the outer periphery thereof. A permanent ring-shaped magnet 29 is disposed within the float member 27 for actuating the reed switch 25 in the stepped projection 21. The downward movement of the float member 27 is limited by a stopper secured to the lowermost portion of the stepped projection 21.

The diaphragm member 30 is made of a material having sufficient sealing characteristics and flexibility, such as synthetic rubber. The diaphragm member 30 has an annular brim 30a detachably, but fluid-tightly, secured to the open end of the casing 10; an extendable or bendable portion 31 formed contiguous to and integral with the brim 30a; and an annular valve body section 32 at the central portion of the diaphragm member 30. As is shown in FIGS. 2 and 4, the valve body section 32 includes an annular support 33 of substantially circular shape in section, having a predetermined diameter; and an annular lip 34 projecting upwardly and inwardly from the upper side of the support 33. The annular support 33 is provided with a plurality of (in this embodiment, eight) vertical recesses 35, as is clearly shown in FIGS. 4 and 6.

Within the casing 10, as assembled with the cap member 20 and diaphragm member 30, an upper chamber $R_1$ is defined by the diaphragm member 30 between the under side of the cap member 20 and the upper side of the diaphragm member 30, and a lower chamber $R_2$ is also defined by the diaphragm member 30 between the under side of the diaphragm member 30 and the liquid level of the brake fluid stored in the casing 10. The upper chamber $R_1$ is in communication with the atmosphere through vent hole 22 of the cap member 20, while the lower chamber $R_2$ is normally sealed by the diaphragm member 30 to maintain the inner pressure at substantial atmospheric level. The valve body 32 of the diaphragm member 30 and the outer periphery of the stepped projection 21 of the cap member 20 constitute a control valve means A positioned between and upper and lower chambers $R_1$ and $R_2$ for controlling the air flow between chambers. The control valve means A has two functions, one being to serve as an inlet valve allowing air flow only from the upper chamber $R_1$ to the lower chamber $R_2$, and the other being to serve as an outlet valve allowing the air flow only from the lower chamber $R_2$ to the upper chamber $R_1$. To state this more specifically, when the pressure in the lower chamber $R_2$ is equal to that of the upper pressure atmospheric level), the valve body 32 is in sealed contact with the outer periphery of the large diameter portion of the stepped projection 21 by the elasticity of the valve body 32. When the pressure in the lower chamber $R_2$ rises above the atmospheric level, the annular lip 34 will bend outwardly about the support 33 due to the pressure difference between the two chambers $R_1$ and $R_2$, thereby allowing the air flow from the lower chamber $R_2$ to the upper chamber $R_1$. When the pressure in the lower chamber $R_2$ drops below the atmospheric pressure (vacuum condition), as shown in FIG. 6, the annular support 33 will ride over the annular outward projection 21a due to the pressure difference between the two chambers $R_1$ and $R_2$. This causes the lip 34 to be forced outwardly by the projection 21a to allow the air flow from the upper chamber $R_1$ to the lower chamber $R_2$.

With respect to the operation of the first embodiment, when the liquid level in the casing 10 is unchanged, entrance of water, dirt or exterior air into the lower chamber $R_2$ is prevented, due to the sealed contact between the lip 34 and the outer periphery of the stepped projection 21. Even when the liquid level is changed, so far as the variations in liquid level are within the extendable range of the diaphragm member 30, the pressure in the lower chamber $R_2$ may be maintained at the atmospheric level by the extendable movement of the portion 31 of the diaphragm member 30 in response to variations in liquid level in the casing 10.

When the liquid temperature in the casing 10 is so increased by the influence of the increase in the surrounding air temperature, that the liquid expands to raise the surface level thereof over the extendable range of the diaphragm member 30, the pressure in the chamber $R_2$ increases due to the excess level rise (i.e., excess reduction of volume in the chamber $R_2$). Then, the annular lip 34 is bent outwardly by the increased pressure in the chamber $R_2$, thereby allowing the air flow from the lower chamber $R_2$ to the chamber $R_1$ through grooves 21 and recesses 35. This valve operation is momentary, and thereafter the lip 34 may again come in contact with the outer periphery of the stepped projection 21 by the self-returning force to seal the lower chamber $R_2$, maintaining the atmospheric level therein.

When the liquid level in the casing 10 is so reduced as to exceed the extendable range of the diaphragm member 30, the pressure in the lower chamber $R_2$ will drop below the atmospheric level (vacuum condition). In this case, the valve body 32 is attracted downwardly by the pressure difference between the two chambers $R_1$ and $R_2$, as shown in FIG. 6, and the support 33 thereof rides over the annular outward projection 21a, causing the lip 34 to be forced to extend outwardly by the projection 21a to allow the air flow from the upper chamber $R_1$ to the lower chamber $R_2$. Simultaneously, the float member 27 is moved downward in response to the liquid level reduction, thereby actuating the reed switch 25 to inform the driver of the vehicle of the deficiency of brake fluid.

In the first embodiment, the lip 34 is formed integral with the support 33. The support 33 forces the lip supported thereon to bend outwardly. It should be noted, however, that the support 33 may be removed if the lip 34, itself, has such rigidity that the top end of the lip may be outwardly bendable by the pressure rise in the lower chamber $R_2$.

Referring now to the second embodiment in accordance with FIGS. 7 through 9, there is shown a control valve means B which corresponds to the control valve means A in the previous embodiment. The control valve means B in this embodiment includes an annular lip 134 formed at the inner periphery of a diaphragm member 130. An annular downward projection 121a is formed at the upper part of a cylindrical stepped projection 121, and a vertical recess 121c is provided at the middle portion of the stepped projection 121.

Other elements or parts of this embodiment are substantially the same to the corresponding elements or parts of the previous embodiment, and therefore, the constructional explanation thereof may be omitted. These elements have been designed with reference numerals corresponding to the numerals in FIGS. 1–6, each numeral differing by the addition of 100.

In the operation of the second embodiment, when the liquid level is unchanged or changed within the extendable range of the diaphragm member 130, the annular lip 134 is in sealed contact with the outer peripheral portion of the stepped projection 121 due to the elasticity of the lip 134. This interrupts fluid communication between chambers $R_1$ and $R_2$. When the liquid level rises over the extendable range of the diaphragm member 130, the lip 134 will be bent outwardly by the pressure difference between the chambers $R_1$ and $R_2$ to allow the air flow from the lower to upper chambers $R_1$ and $R_2$ through bore 121b provided on the annular downward projection 121a. On the other hand, when the liquid level drops to exceed the extendable range of the diaphragm member 130, the annular lip 134 is attracted downward by the vacuum in the lower chamber $R_2$ thereby allowing the air flow from the upper chamber $R_2$ to the lower chamber $R_1$ through recess 121c of the stepped projection 121.

As explained in the previous embodiment, it should be noted that the projection 121a may be removed if the annular lip 134, itself, has such rigidity that the top end of the lip 134 may be outwardly bendable by the pressure increase in the lower chamber $R_2$.

Although the two embodiments described heretofore show the cap member 20 or 120 as detachably mounted on the casing 10 or 110 by means of the diaphragm member 30 or 130, it may be possible to mount the cap member directly upon the casing.

What is claimed is:
1. A sealed type hydraulic reservoir comprising:
a casing having an upper open end for storing brake fluid therein to be supplied to a hydraulic brake master cylinder;
a cap member detachably mounted on the open upper end of said casing;
an elastic seal member, the outer peripheral portion thereof being secured to said cap member for seal- ing the brake fluid stored in said casing, said seal member being movable between upper and lower predetermined positions;

a first chamber within said reservoir and defined between the under side of said cap member and the upper side of said seal member, said first chamber being in communication with the atmosphere through a vent hole provided in said cap member;

a second chamber within said reservoir and defined between the under side of said seal member and the liquid surface of the brake fluid in said casing, said second chamber being normally sealed by said seal member to maintain the pressure therein at the atmospheric level;

an annular projection provided on said cap member at the central portion thereof and extending downwardly within said casing; and check valve means including an annular lip formed at the central portion of said seal member, said lip being normally in sealed contact with the outer periphery of said annular projection, said lip interacting with the outer periphery of said projection for allowing air flow from said lower chamber to said upper chamber when the pressure in said lower chamber rises above the atmospheric level and said seal member moves to said upper predetermined position, and means on the outer periphery of said projection for interacting with said lip for allowing air flow from said upper chamber to said lower chamber when the pressure in said lower chamber drops below the atmospheric level and said seal member moves to said lower predetermined position.

2. A sealed type hydraulic reservoir according to claim 1, wherein said elastic seal member has an extendable portion between the outer peripheral portion and said annular lip, said seal member being extendable within said casing in response to variations in the liquid level of the brake fluid in said casing for maintaining the pressure in said lower chamber at the atmospheric level.

3. A sealed type hydraulic reservoir according to claim 2, wherein said check valve means is operable only when the liquid level variations exceed the extendable range of said seal member.

4. A sealed type hydraulic reservoir according to claim 1, wherein said means for interacting with said lip includes a lip-engaging portion, said annular lip being deformed to separate from said annular projection for allowing air flow from said lower chamber to said upper chamber when the pressure in said lower chamber rises above the atmospheric level and said seal member moves to said upper predetermined position, and said annular lip being moved downward to be engaged with said lip-engaging portion of said annular projection for allowing air flow from said upper chamber to said lower chamber when the pressure in said lower chamber drops below the atmospheric level and said seal member moves to said lower predetermined position.

5. A sealed type hydraulic reservoir according to claim 4, wherein said lip-engaging portion of said annular projection is a convex surface extending outwardly from the outer periphery of said annular projection, said annular lip being deformed by riding over said convex surface to separate from the outer periphery of said annular projection when the pressure in said lower chamber drops below the atmospheric level and said seal member moves to said lower predetermined position.

6. A sealed type hydraulic reservoir according to claim 1, wherein said means for interacting with said lip includes a concave surface forming a depression in the outer periphery of said annular projection, said annular lip being moved downward when the pressure in said lower chamber drops below the atmospheric level, the sealed contact between said lip and said outer periphery being broken when said downward movement causes said lip to enter said depression.

* * * * *